United States Patent Office 3,254,030
Patented May 31, 1966

3,254,030
PLUTONIUM ENRICHED URANIUM FUEL FOR NUCLEAR REACTORS
Gaetan G. J. Michaud, Toronto, Ontario, and Robert G. Hart, Deep River, Ontario, Canada, assignors to Atomic Energy of Canada Limited, Ottawa, Canada, a company incorporated pursuant to the Atomic Energy Control October 1946
No Drawing. Filed July 27, 1962, Ser. No. 213,035
9 Claims. (Cl. 252—301.1)

This invention relates to fuels for nuclear reactors and more particularly to nuclear reactor fuels of a mixture of $PuO_2$ and $UO_2$.

The following are characteristics of the ideal enriched fuel element for a nuclear reactor:

(1) It should have a low parasitic absorption of neutrons and small changes in reactivity during operation.

(2) The heat output from each element should remain essentially constant during operation to ease the engineering problems of heat removal.

(3) There should be a high utilization of burnup of the original fissile material.

(4) The fuel elements should be relatively inexpensive to fabricate, and have a high gas retention and corrosion-erosion resistance.

(5) The fuel elements should be readily amenable to chemical reprocessing.

(6) The new fissile material formed in the reactor should be separable from the old.

The enrichment of U fuel with Pu is desirable because Pu has no parasitic absorption of neutrons and the heat output of such enriched fuel would remain essentially constant due to the formation of replacement fissile material by neutron capture in the fertile material. Further, Pu being an irradiation by-product is inherently less expensive than natural fissile materials. Thus, the enrichment of U fuel with Pu involves the problem of providing a fuel having a high burning quality which is relatively inexpensive and from which the newly formed irradiation Pu is separable from the old enrichment, irradiated Pu. It will be understood that after irradiation the old enrichment Pu contains a significant precentage of parasitic Pu 242 and is not a useful fuel, while the newly formed Pu is a useful fuel. If the two are not separated then the old poisons the new and the mixture is not as valuable a fissile material.

The object of the present invention is to provide a useful Pu enriched U fuel for nuclear reactors.

In the irradiation of U the Pu formed by neutron capture in $U^{238}$ goes into solid solution with the remaining U, both as oxides, and the solid solution is soluble in nitric acid. On the other hand the solubility of $PuO_2$ alone in nitric acid is less than about 0.7%. The mechanism of the solid solution formation probably involves diffusion of the similar Pu and U atoms across the contact surfaces of Pu and U oxide particles. The tendency to form solid solution is therefore believed to be related to surface area of the particles, and also temperature, since in general the rate of diffusion will tend to increase with temperature.

It has been discovered that in admixture with $UO_2$, $PuO_2$ in refractory form having a surface area within a specific range will substantially resist the tendency to go into solid solution with U under irradiation conditions. To the extent that the Pu does not go into solid solution, it can be separated from the new irradiation Pu by leaching out the latter with nitric acid. The surface area of $PuO_2$ being difficult to determine experimentally is expressed herein in terms of particle size.

It has been further determined that if more than about 10% of the old Pu remains in the new Pu after leaching that the new Pu contains too much $Pu^{242}$ for economic recycling as fuel enrichment.

Broadly this invention relates to a nuclear fuel comprising a mixture of at least 75% by weight $UO_2$ and particles of refractory $PuO_2$, at least about 80 wt. percent having a size between about 44 and about 840μ, said $PuO_2$ being not more than 10% by weight soluble from the fuel mixture in conc. $HNO_3$ at 60° C. after three hours.

The tendency to form solid solution is probably also affected by the size and nature of the $UO_2$ particles, but other required fuel characteristics limit the desirability of decreasing the surface area and limit the nature of the $UO_2$. For example, the fuel must have a high and uniform density and uniformity. Thus, well known forms of $UO_2$ particles for example as described in A.E.C.L. Report C.R.C.E. 716—Parts I, II and III are suitable. The desirable density of oxide fuels is at least 90% and more preferably 95% of theoretical density and thus, this requirement and uniformity requirements control the desirability of increasing the particle size of enrichment $PuO_2$.

Refractory $PuO_2$ as defined herein is prepared by pyrolizing $PuO_2$ at high temperatures. The pyrolysis causes densification and some agglomeration of the oxide powder into frits. The strength and size of the frits is dependent on the oxide source and pyrolysis temperature. The appearance and properties of Pu oxides vary with the source. For example, suitable frit size and strength has been obtained at pyrolizing temperatures as low as 850° C. for hydroxide source $PuO_2$ and about 900° C. for nitrate and oxalate $PuO_2$. Preferably pyrolizing temperatures are at least 1200° C. for hydroxide $PuO_2$, 1300° C. for nitrate $PuO_2$ and 1400° C. for oxalate $PuO_2$. In general solid solubility with $UO_2$ has been found to decrease with increased pyrolizing temperatures, but an optimum pyrolizing temperature appears to have been found for hydroxide $PuO_2$ at about 1250° C. and for nitrate $PuO_2$ at about 1450° C.

It has been observed that hydroxide $PuO_2$ pyrolized at 550° C. contains very few fines and at 1250° C. the frits are larger. At 1450° C. however, there are more fines than at 1250° C. Nitrate $PuO_2$ exhibits many fines at 300° C., but very few at 900° C. Above 1550° C. there may be some increase in the number of fine particles. At these higher temperatures the hydroxide and nitrate $PuO_2$ frits appear to be more brittle and may tend to break-up during compaction in preparing the fuel.

Oxalate $PuO_2$ exhibits many sub-micron particles at 650° C. pyrolysis, but the number is decreased substantially at 1450° C.

While sulphate $PuO_2$ pyrolizes with few fines with frit particle size increasing with pyrolizing temperature, yet it has been found that a relatively high solid solubility is obtained as compared with hydroxide, nitrate and oxalate source $PuO_2$. It is possible that low frit strength or low density or both are responsible.

The preferred refractory $PuO_2$ is therefore hydroxide $PuO_2$ pyrolized at, at least about 850° C. and more preferably 1250° C., nitrate $PuO_2$ pyrolized at, at least about 1300° C. and more preferably at 1450° C. and oxalate $PuO_2$ pyrolized at, at least about 1400° C.

The maximum desirable enrichment of $UO_2$ fuel with $PuO_2$ is about 25 weight percent of $PuO_2$ and is preferably in the order of about 2 weight percent $PuO_2$.

Experimental results indicate that for the preparation of a suitable fuel, at least about 80 wt. percent of the refractory $PuO_2$ enrichment frits must be of a size from about 44 to 840μ or passing through a No. 20 and retained on a No. 325 U.S. screen and preferably −30+150 screen. Unsized oxalate, nitrate and hydroxide $PuO_2$ powders can give satisfactory frits if pyrolized at the higher temperatures. It has been found desirable to pelletize compact and sinter the $PuO_2$ powder, (particularly the oxalate $PuO_2$) to give a dense frit and then grind to a refractory particle of suitable size before mixing with $UO_2$. The fines can be recycled in this process.

The fuel is prepared by uniformly mixing the $UO_2$ and refractory $PuO_2$ particles, compacting to the desired shape and sintering to a unitary body of high density.

A preferred procedure is illustrated in the following example:

Uranium diode powder was prepared from ammonium diuranate according to the procedure defined in A.E.C.L. report C.R.C.E. 716 parts I, II and III, to give an O/U ratio of 2.260.

Plutonium oxide starting material was prepared according to the procedure described in report AERE–R– 2939 (1959), using ignition temperatures of 650° C., 300° C. and 550° C. for the oxalate, nitrate and hydroxide respectively. The nitrate and hydroxide $PuO_2$ powders (unsized) were pyrolized at 1450° C. for two hours and then the frits sized to −30+150 U.S. screen. About 50 wt. percent of the nitrate and about 90 wt. percent of the hydroxide $PuO_2$ particles were of this size. The oxalate $PuO_2$ was first pressed at 60,000 p.s.i. into pellets and then pyrolized in air at 1450° C. for two hours to give 92% theor. density. This pre-densified $PuO_2$ was crushed and sized to −30+150 U.S. screen. About 80 wt. percent was in this size range.

The resulting refractory $PuO_2$ was mixed with the $UO_2$ in a mechanical vibrator for 2 minutes to give a $PuO_2$ concentration of 2%. The mixed powder was pressed at 60,000 p.s.i. to give 10 gm. green pellets of 55% theor. density. The green pellets were sintered at 1450° C. for two hours in an inert atmosphere and for 10 minutes in hydrogen and then cooled in hydrogen to give an O/U ratio in the $UO_2$ of 2.005 and a density of about 10.6 gm./cm.$^3$ (about 96.5% theor. density). The heating and cooling rate was 550° C./hour.

The solid solubility was determined by leaching the sintered pellets in conc. nitric acid at 60° C. for 3 hours. The Pu content of the solutions was determined by alpha particle counting. The results are shown in Table I.

TABLE I

| $PuO_2$ origin: | Wt. percent total Pu dissolved |
|---|---|
| Oxalate—pren-densified and sized | 2.6 |
| Nitrate | 3.5 |
| Hydroxide | 4.5 |

Suitable reducing gases other than hydrogen can be used. The pellets can be pressed at pressures down to about 40,000 p.s.i. The pre-densified sized oxalate $PuO_2$ is preferred as it gives a very low Pu solubility. The pyrolysis of the $PuO_2$ may be sufficiently effected in less than two hours. Normally there is no advantage in prolonging the heat treatment beyond about two hours.

We claim:

1. A fuel for nuclear reactors comprising a mixture containing at least 75% by weight of $UO_2$ and the remainder refractory $PuO_2$, at least 80% by weight of said $PuO_2$ being of a size from 44 to 840 microns, said $PuO_2$ being not more than 10% soluble from said mixture in concentrated nitric acid in 3 hours at 60° C., said mixture having a density of at least 90% of theoretical density.

2. A fuel as defined in claim 1 having a density of at least 95% of theoretical density.

3. A fuel as defined in claim 1 containing by weight 98% of $UO_2$ and 2% of said $PuO_2$.

4. A method of preparing a fuel for nuclear reactors comprising the steps of igniting one of the group of Pu compounds consisting of Pu oxalate, Pu nitrate and Pu hydroxide to form $PuO_2$, pyrolizing said $PuO_2$ at a temperature of at least 850° C. for the hydroxide $PuO_2$, at least 900° C. for the nitrate $PuO_2$, and at least 900° C. for the oxalate $PuO_2$ to form $PuO_2$ particles, at least 80% by weight of said $PuO_2$ particles having a size from 44 to 840 microns, intimately mixing together at least 75% by weight of mixture of $UO_2$ with said $PuO_2$ particles, compacting and sintering said mixture to a density of at least 90% of theoretical density.

5. The method as defined in claim 4 in which said $PuO_2$ ignited from Pu oxalate is compressed at a pressure of at least 40,000 p.s.i. into pellets and pyrolized at a temperature of at least 1400° C.

6. The method as defined in claim 4 in which the $PuO_2$ is pyrolized at a temperature of at least 1200° C. for the hydroxide $PuO_2$ and at least 1300° C. for the nitrate $PuO_2$.

7. A method of preparing a fuel for nuclear reactors consisting essentially of the steps of igniting Pu oxalate at a temperature of 650° C. to form $PuO_2$, compressing said $PuO_2$ into pellets at a pressure of 60,000 p.s.i., pyrolizing said pellets in air at a temperature of 1450° C. for two hours to form refractory $PuO_2$, crushing said refractory $PuO_2$ into particles and sizing said particles, intimately mixing with $UO_2$ particles, 2% by weight of the mixture, of said $PuO_2$ particles having a size of −30+150 U.S. screen, compacting and sintering said mixture to a density of at least 96% of theoretical density.

8. A method of preparing a fuel for nuclear reactors consisting essentially of the steps of igniting Pu nitrate at 300° C. to form $PuO_2$, pyrolizing said $PuO_2$ at 1450° C. for 2 hours to form refractory $PuO_2$, sizing said refractory $PuO_2$ to −30+150 U.S. screen, intiamtely mixing 2% by weight of the mixture of said sized refractory $PuO_2$ with $UO_2$, and compacting and sintering the mixture to a density of at least 96% of theoretical density.

9. A method of preparing a fuel for nuclear reactors consisting essentially of the steps of igniting Pu hydroxide at a temperature of 550° C. to form $PuO_2$, pyrolizing said $PuO_2$ at 1250° C. for 2 hours to form refractory $PuO_2$, sizing said refractory $PuO_2$ to −30+150 U.S. screen, intimately mixing 2% by weight of the mixture, of said sized refractory $PuO_2$ with $UO_2$, and compacting and sintering the mixture to a density of at least 96% of theoretical density.

References Cited by the Examiner

UNITED STATES PATENTS 2,868,707  1/1959  Alter et al.

OTHER REFERENCES

AEC Report HW–69832, June 1961, p. 3.
AEC Report TID–7456 (Book 2), November 1957, pp. 542 and 547.
AEC Document GEAP–3487, Aug. 15, 1960.
Journal of British Nuclear Energy Society, vol. 1, No. 1, January 1962, p. 5.
Nuclear Science Abstracts, vol. 15, November-December 1961, Abstract No. 31813.
Nuclear Science Abstracts, vol. 15, September-October 1961, Abstract No. 25168.
Second Geneva Conference on Atomic Energy, September 1958, vol. 6, pp. 215 and 216.

LEON D. ROSDOL, *Primary Examiner*.

REUBEN EPSTEIN, CARL D. QUARFORTH,
*Examiners*.

R. W. MacDONALD, A. G. BOWEN, B. R. PADGETT,
*Assistant Examiners*.